March 27, 1956     M. E. TRUE     2,739,437
LAWN TRIMMER AND EDGER
Filed Feb. 15, 1954     2 Sheets-Sheet 1
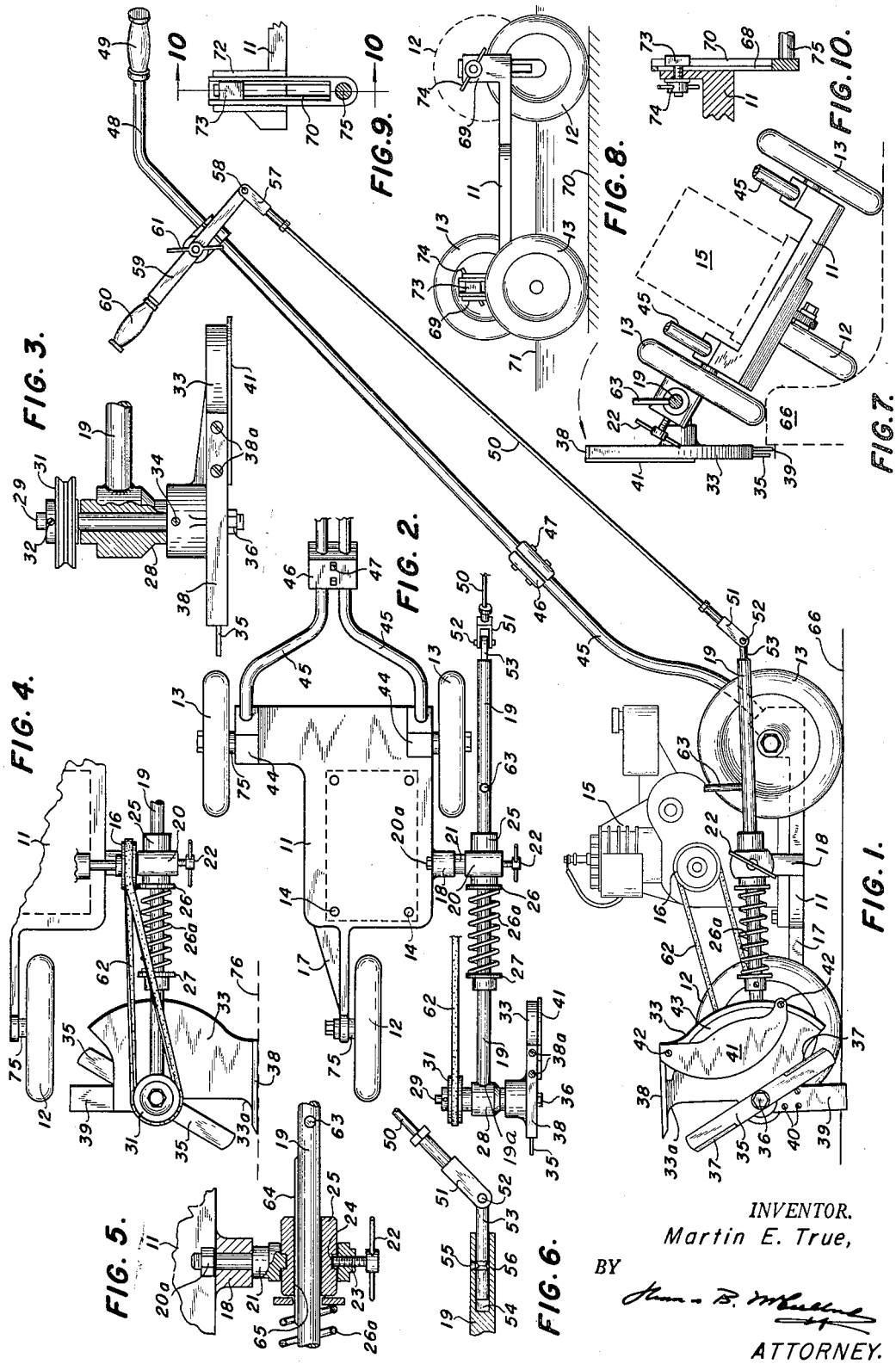
INVENTOR.
Martin E. True,
BY
ATTORNEY.

United States Patent Office 2,739,437
Patented Mar. 27, 1956

2,739,437

LAWN TRIMMER AND EDGER

Martin E. True, Houston, Tex.

Application February 15, 1954, Serial No. 410,099

18 Claims. (Cl. 56—25.4)

The present invention is directed to a device for edging and trimming lawns. In its more specific aspects, the invention is directed to a power driven lawn trimmer and edger which is easily manipulated. More particularly, the invention has to do with a power-driven lawn trimmer and edger which may be used on curbs, along flower beds, around trees, and the like.

The present invention may be briefly described as a lawn trimmer and edger which is provided with a three-wheeled carriage having one leading wheel. The carriage is adapted to carry a power means, such as an electric motor or an internal combustion engine. The carriage has an arm mounted laterally on the carriage and the arm is mounted for rotatable and tiltable movement. A spindle is mounted on the leading end of the arm and the spindle carries a rotatable shaft. A blade provided with a guard means is mounted on the shaft and is operatively connected through a driving means to the power means for rotating the shaft. A connecting rod is connected to the trailing end of the arm and means are provided on the connecting rod for tilting the arm and the spindle. The arm is mounted laterally on the carriage such that the blade may rotate through 360° and clear the leading wheel.

The leading wheel and one of the trailing wheels of the carriage may be adjusted vertically with respect to the cariage such that two of the wheels of the carriage may be on the plane and the other wheel of the carriage may be on a vertically displaced plane.

The guard means of the improved trimmer and edger is provided with a pointed guide member which is designed to pull grass into the blade when it is operating in a horizontal position. The guard member is also provided with a flat guide member opposite the pointed guide member for guiding the blade when operating in a vertical position.

The guard member is provided with a self-cleaning device including a semi-circular plate which is attached to the outer edge of the guard member to define an opening back of the plate with the guard member sufficient to allow debris to be thrown from the guard member away from the operator of the improved lawn trimmer and edger and without clogging the guard.

The present invention will be further illustrated by reference to the drawing in which:

Fig. 1 is a side view of the trimmer and edger;

Fig. 2 is a fragmentary top view with parts broken away;

Fig. 3 is an enlarged plan view, with parts broken away and shown in section, of the spindle;

Fig. 4 is a plan view of the spindle and leading end of the arm showing the driving mechanism;

Fig. 5 is an enlarged plan view of the locking mechanism shown in Figure 4, with parts broken away and shown in section;

Fig. 6 is an enlarged elevational view, with parts broken away and shown in section, illustrating the connection of the trailing end of the arm to the connecting rod;

Fig. 7 is a back view of the apparatus with parts broken away showing utilization of the device on a curb;

Fig. 8 is a reduced view of the carriage with the leading wheel and one of the trailing wheels adjustable in height;

Fig. 9 illustrates the adjusting means of Fig. 8;

Fig. 10 is a sectional view at right angles of the adjusting means of Fig. 9;

Figure 11:
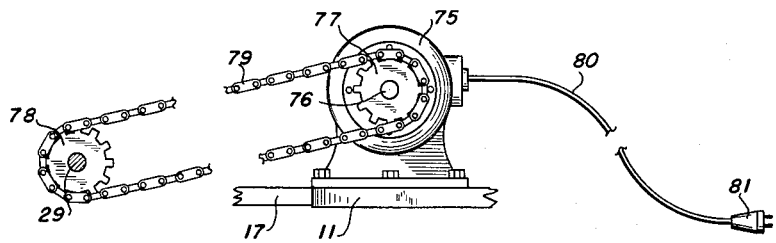
Fig. 11 is a view with parts cut away showing the use of an electric motor and a drive chain.

Referring now to the drawing in which identical numerals will be employed to designate identical parts, numeral 11 designates a carriage provided with a leading rubber-tired wheel 12 and trailing wheels 13 which are also rubber-tired. Mounted on the carriage 11 by bolts 14 is a power means illustrated by internal combustion engine 15 provided with a drive sheave or pulley 16. Power means 15 may be provided with suitable controls, not shown, such as motor and throttling controls. Suitably the power means 15 may also be an electric motor with the required control mechanism.

The carriage 11 is provided with a bracket 17 to which is connected the leading wheel 12 as shown. Carried laterally on the carriage 11 on a laterally extending member 18 connected integrally or attachably to the carriage 11 is a tiltable and rotatable arm 19. The arm 19 is journalled in a housing 20 for rotation and the housing 20 may be tilted by movement in an arc on the shaft 21 which is held by a nut 20a on member 18. The housing 20 is provided with a locking mechanism 22 which comprises a threaded screw 23 which engages with a recess 24 of the collar 25.

Arranged between a shoulder 26 attached to collar 25 and a shoulder 27 on arm 19 is a biasing means 26a which serves to urge the arm 19 in a forward direction, the shoulders 26 and 27 being arranged to allow the arm 19 to be moved forward by biasing means 26a to take up any slack in the driving mechanism as will be described.

Connected to the forward or leading end 19a of the arm 19 is a spindle 28 which carries a shaft 29. The shaft 29 has a sheave or pulley 31 attached to it by a set screw 32.

Carried by the spindle 28 is a guard means 33 which may be attached to the spindle 28 by screws 34.

The shaft 29 has a cutter blade 35 attached to it by a hex nut 36. The cutter blade is provided with cutting surfaces 37 as indicated.

The guard 33 is provided with a pointed guide member 38 on the outer edge of the guard member which cooperates with the curved surface 33a of the guard 33 for pulling grass into the blade 35 when the blade 35 is operating in a horizontal position, as shown in Fig. 4, and is also provided with a flat guide member 39 to guide the blade when it is operating in a vertical position. It is to be noted that the pointed guide member 38 is detachably connected to guard 33 by screws 38a. The curved surface 33a serves as a guide surface with the member 38 to pull grass into the blade. The surface 33a may be a flat surface at an acute angle to the leading edge of guard 33. The flat guide member 39 is attached to the guard 33 by screw threads 40. Guard means 33 covers approximately 180° of blade 35 to protect the operator from flying debris.

The guard member 33 has a self-cleaning guard plate 41 attached to the outer edge thereof by screws 42. This plate 41 is semi-circular in shape and is arranged to provide an opening 43 between the back edge of the plate 41 and the outer edge of the guard 33 to allow debris and the like to be thrown from the guard 33 in a direction away from the operator. This plate 41 and the opening 43 is a self-cleaning feature which prevents clogging of the guard 33.

The carriage 11 has upstanding members 44 to which are attached guide or rod members 45 which are secured together by a split block 46 connected by bolts 47. The guide or steering means 45 extends at its upper ends at an angle away from each other to form handles 48 which may be provided with rubber or the like hand gripping means 49.

Connected to the trailing end of the arm 19 is a connecting rod 50 for rotation of the arm 19 with respect to the connecting rod 50. The connecting rod 50 is provided with a yoke mechanism 51 pivotally connected by a pivot pin 52 with a link 53 which is locked in a recess 54 of the arm 19 by a set screw 55 in the notch 56 which allows the arm 19 to rotate freely with respect to the link 53.

The connecting rod 50 is carried to the guide means 45 through a link mechanism 57 including a pivot pin 58 which connects to a handle member 59 provided with handle 60 which may suitably be constructed of rubber or the like material. The member 59 may be locked in place through a locking member 61 which will allow the member 59 to be moved through an arc and locked in one particular position.

The sheave 16 on the motor 15 is connected to the sheave 31 by a V-belt 62 which provides power for the blade 35 for rotation of same.

The arm 19 is provided with an upstanding member 63 which may be used for rotating the arm 19 about its axis to adjust the blade to any position as may be desired. It is to be noted in this connection that the arm 19 is provided with a key member 64 which is slidably engageable with a keyway 65 in the member 25.

Referring now to Fig. 7, it will be seen that the motor 15 is indicated by the dotted lines and that the carriage 11 is shown operating on a curb 66, also shown in dotted lines, the arm 19 having been rotated about its axis to allow the blade 35 to rotate in a vertical axis. The arm 19 is locked in position with locking mechanism 22 as shown.

Referring now to Fig. 8, it will be noted that the carriage 11 is provided with an upstanding member or adjusting means 68 such that the leading wheel 12 is arranged on a horizontal plane below the normal horizontal plane indicated by the dotted lines for the wheel 12. Also it will be noted that the wheel 13 adjacent the viewer is provided with an upstanding adjusting means 69 which is similar to the adjusting means 68. It will be noted that the wheel 13 facing the viewer is on the same horizontal plane 70 as the wheel 12 and that the wheel 13 away from the viewer is on a horizontal plane 71, allowing the carriage 11 to be mounted on a parallel horizontal plane.

Referring now to Figs. 9 and 10, the adjusting means 68 and 69 has a slidable member 70 arranged in the member 72 which allows the wheels 12 and 13, which are connected to the member 70, to be moved with respect to the carriage 11 by means of a member 73 which is arranged in member 70 by adjustment of locking means 74 which is shown in more detail in Fig. 10, the wheels 12 and 13, as the case may be, being mounted on the shaft or axle 74a.

Referring now to Fig. 11, an electric motor 75 is mounted on carriage 11 and is provided with a drive shaft 76 on which is mounted a drive sprocket wheel 77. In this embodiment the sheave or pulley 31 on shaft 29 is replaced by a drive sprocket wheel 78 and the drive sprockets 77 and 78 are operatively connected by a drive chain 79 arranged over the sprocket wheels 77 and 78 to rotate shaft 29 and blade 35. Power is received by or delivered to electric motor 75 through an extension cord 80 or plugging electric plug 81 into an electrical circuit such as a house circuit, not shown.

Figure 12:
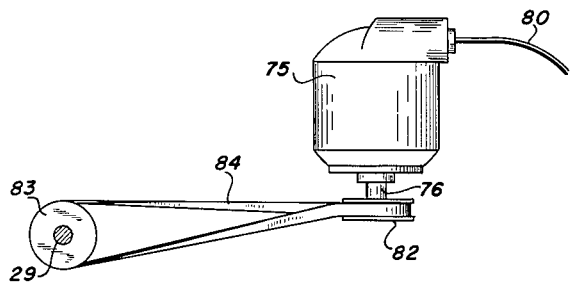
Fig. 12 is a top view of an electric motor as a power means and a flat belt drive.

In Fig. 12 electric motor 75 has a pulley 83 arranged on shaft 76 and arranged over the pulley 82 and pulley 83 on shaft 29 is a flat belt 84 which provides power to rotate shaft 29 and blade 35.

The improved trimmer and edger of the present invention operates as follows:

The motor, such as internal combustion engine 15, is started and the arm 19 arranged for the blade 35 to rotate in a vertical plane; for example, to trim along the edge of a curb 66, such as shown in Figs. 1 and 7. In this particular instance the flat guide member 39 moves along the edge of the curb and cuts the grass overrunning the curb in an even edge, the guide member forming a furrow or trench for the blade 35 to rotate in.

When operating in a horizontal plane, such as along the edge of a flower bed as indicated by the dotted line 76 in Fig. 4, the blade 35 will be rotated 90° and set in this position which will cause the V-belt 62 to operate with a 90° twist. If it is in this position, the pointed guide member 38 and the surface 33a cause runners and tendrils of grass and the like to be pulled into the area circumscribed by the blade 35 allowing these runners to be cut off in a neat, straight line.

When it is desired to raise the blade 35, this may be done by rotating the locking mechanism 61 and moving the member 59 towards the operator which causes the arm 19 and the spindle 28 to be tilted upwardly. By moving the member 59 away from the operator, the blade may be lowered as desired and then locked with the mechanism 61. Also after rotation of the spindle 28 and the blade 35, as shown in Fig. 4, the arm 19 may be locked with locking mechanism 22.

The embodiments of Figs. 11 and 12 operate like the embodiments of Figs. 1 to 10 on energizing the motor 75 with electrical current delivered through extension cord 80 on plugging the plug 81 into a suitable electrical circuit.

It will be seen from the foregoing description and drawing that the device allows improved trimming and edging of lawns and is, therefore, quite useful. The guide member is provided with both edging and trimming guides which are easily replaceable when worn. The edging guide protects the blade while the trimmer is rolling on pavement and may be adjusted for the width of the trench or furrow. The pointed guide prevents the cutting blade from hitting foundations, walls, fences, and the like, and protects shrubs and trees while trimming around them. The pointed guide 38 with the curved surface 33a is designed to pull the grass into the blade. This feature of my invention is important and gives substantially improved results in trimming operations.

The apparatus of the present invention may be raised or lowered by the operator from a standing position with the lever on the handle. The spindle head may also be rotated from trimming to edging and locked into any position in between and all adjustments may be made while the trimmer and edger is in motion. The biasing means between the shoulders 26 and 27 maintains tension on the belt 62 and no adjustment is necessary. If the spindle head becomes jammed or locked, tension is automatically relieved on the V-belt which prevents damage to the trimmer and also prevents stalling of the engine.

The parts of the apparatus are easily replaceable when worn. Thus the present invention is quite useful and has been used successfully in trimming and edging lawns with flower beds, trees, curbs and other obstructions present yet presenting a neat and orderly appearance with the minimum of effort.

The blade 35 may be of any convenient size limited only by clearing the leading wheel 12. For example, a trimmer and edger having a blade constructed of a flat piece of steel 1¾ inches wide by ⅛ inch thick, having a radius of 4¾ inches, has been used successfully in trimming lawns.

While I have described my invention as being powered by a V-belt, it is to be understood that other belts or a power chain sprocket drive may be used.

Also, it is contemplated that my trimmer and edger may be used with a removable or replaceable power means; for example, a lawn mower motor may be placed on the carriage 11 and when the trimming and edging job for a particular lawn is completed, the motor may be placed back on the lawn mower frame for use therewith.

The nature and objects of the present invention having been completely illustrated and described, what I wish to claim as new and useful and to secure by Letters Patent is:

1. A lawn trimmer and edger which comprises a three-wheeled carriage having one leading wheel and aligned trailing wheels a power means carried by said carriage, a tiltable arm rotatably mounted on said carriage having a leading end and a trailing end, a spindle mounted on the leading end of said arm, a rotatable shaft carried by said spindle, a blade mounted on said shaft and operatively connected to said power means for rotation of said blade, a self-cleaning guard means on said spindle covering approximately 180° of said blade for protecting the operator of said trimmer and edger from flying debris, said self-cleaning guard means being provided with a guide surface and a pointed guide member attached laterally to said guard means, said pointed guide member leading said guard means, and cooperating with said guide surface for pulling grass tendrils and runners into the cutting area of the blade operating in a trimming position a connecting rod connected to the trailing end of said arm, and means attached to said connecting rod for tilting said arm and spindle, said arm being mounted laterally on said carriage such that said blade clears said leading wheel on rotation of said arm through 360°.

2. A lawn trimmer and edger which comprises a three-wheeled carriage having one leading wheel and aligned trailing wheels a power means carried by said carriage, a tiltable arm rotatably mounted on said carriage having a leading end and a trailing end, a spindle mounted on the leading end of said arm, a rotatable shaft carried by said spindle, an elongated blade mounted on said shaft and operatively connected to said power means for rotation of said blade, self-cleaning guard means on said spindle covering approximately 180° of said blade for protecting the operator of said trimmer and edger from flying debris, said self-cleaning guard means being provided with a guide surface and a pointed guide member attached laterally to said guard means, said pointed guide member leading said guard means, and cooperating with said guide surface for pulling grass tendrils and runners into the cutting area of the blade operating in a trimming position means attached to said carriage for guiding said carriage, a connecting rod connecting to the trailing end of said arm, biasing means arranged on said arm and urging said arm in a forward direction for maintaining tension on said spindle, and means attached to said connecting rod for tilting said arm and spindle, said arm being mounted laterally on said carriage such that said blade clears said leading wheel on rotation of said arm through 360°.

3. A lawn trimmer and edger which comprises a three-wheeled carriage having one leading wheel and aligned trailing wheels, a tiltable arm rotatably mounted on said carriage having a leading end and a trailing end, a spindle mounted on the leading end of said arm, a rotatable shaft carried by said spindle, a blade mounted on said shaft, guard means on said spindle defining a guide surface with a leading outer edge and covering approximately 180° of said blade for protecting the operator of said trimmer and edger from flying debris, said guard means being provided with a pointed guide member attached laterally to said guard means, said pointed guide member leading said guard means, and cooperating with said guide surface for pulling grass tendrils and runners into the cutting area of the blade operating in a trimming position power means mounted on said carriarge and operatively connected to said shaft for rotating said shaft, a connecting rod connected to the trailing end of said arm, and means attached to said connecting rod for tilting said arm and spindle, said arm being mounted laterally on said carriage such that said blade clears said leading wheel on rotation of said arm through 360°.

4. A lawn trimmer and edger in accordance with claim 3 in which the guard means is provided with a self-cleaning means which prevents debris from accumulating between said blade and guard means.

5. A lawn trimmer and edger in accordance with claim 3 in which the power means is an internal combustion engine.

6. A lawn trimmer and edger in accordance with claim 3 in which the power means is an electric motor.

7. A lawn trimmer and edger which comprises, a three-wheeled carriage having one leading wheel and aligned trailing wheels, a tiltable control arm rotatably mounted on said carriage having a leading end and a trailing end, a spindle mounted on the leading end of said arm, a rotatable shaft carried by said spindle, an elongated blade mounted on said shaft, self-cleaning guard means on said spindle defining a guide surface with a leading outer edge and covering approximately 180° of said blade for protecting the operator of said trimmer and edger from flying debris, said self-cleaning guard means being provided with a pointed guide member attached laterally to said guard means, said pointed guide member leading said guard means, and cooperating with said guide surface for pulling grass tendrils and runners into the cutting area of the blade operating in a trimming position power means for driving said shaft removably mounted on said carriage, driving means operatively connecting said power means and said shaft, means attached to said carriage for guiding said carriage, a connecting rod connected to the trailing end of said arm, biasing means arranged on said arm and urging said arm in a forward direction for maintaining tension on said driving means, and means attached to said connecting rod for tilting said arm and spindle, said arm being mounted laterally on said carriage such that said blade clears said leading wheel on rotation of said arm through 360°.

8. A lawn trimmer and edger in accordance with claim 7 in which the driving means is a belt operating with a 90° twist when said blade is in a horizontal position.

9. A lawn trimmer and edger in accordance with claim 7 in which the inner edge of the guard means is provided with a flat guide member for cutting and trimming along curbs and edges of flower beds when the blade is in a vertical position.

10. A lawn trimmer and edger which comprises, a three-wheeled carriage having a vertically adjustable leading wheel and two aligned trailing wheels, one of said trailing wheels also being adjustable vertically, means for adjusting the height of said leading wheel and at least one of said trailing wheels with respect to said carriage, said adjusting means comprising an upstanding member on said carriage, a vertically movable member connected to said vertically adjustable wheels, and locking means arranged on said upstanding member and in said movable member for fixing the position of said adjustable wheels with respect to the carriage, a tiltable control arm rotatably mounted on said carriage having a leading end and a trailing end, a spindle mounted on the leading end of said arm, a rotatable shaft carried by said spindle, an elongated blade mounted on said shaft, self-cleaning guard means on said spindle provided with a curved guide surface on its leading outer edge and covering approximately 180° of said blade for protecting the operator of said trimmer and edger from flying debris, said guard means being also provided with a pointed guide member attached laterally to said guide means, said pointed guide member leading said guard means, and cooperating with said curved guide surface for pulling tendrils and runners of grass into the area of the blade operating in a trimming position power means for driving said shaft removably mounted on said carriage, driving means operatively connecting said power means and said shaft, means attached to said carriage for guiding said carriage, a connecting rod connected to the trailing end of said arm, biasing means arranged on said arm urging said arm in a forward direction for maintaining tension on said driving means, and means attached to said connecting rod for tilting said arm and spindle, said arm being mounted laterally on said carriage such that said blade clears said leading wheel on rotation of said arm through 360°.

11. A lawn trimmer and edger which comprises, a three-wheeled carriage having one leading wheel and aligned trailing wheels, a tiltable control arm rotatably mounted on said carriage having a leading end and a trailing end, a spindle mounted on the leading end of said arm, means attached to said arm for rotating said arm and spindle, a rotatable shaft carried by said spindle, an elongated blade mounted on the outer end of said shaft and a sheave mounted on the inner end of said shaft, self-cleaning guard means on said spindle provided with a curved guide surface on its leading outer edge and covering approximately 180° of said blade for protecting the operator of said trimmer and edger from flying debris, a pointed guide member on said guard means leading said guard means and cooperating with said curved surface for cutting and trimming close to walls, power means provided with a driving sheave for driving said shaft removably mounted on said carriage, driving means comprising a belt operatively connecting the sheave on said power means with the sheave on said shaft, means attached to said carriage for guiding said carriage, a connecting rod connected to the trailing end of said arm, biasing means arranged on said arm urging said arm in a forward direction for maintaining tension on said driving means, and means attached to said connecting rod for tilting said arm and spindle, said arm being mounted laterally on said carriage such that said blade clears said leading wheel on rotation of said arm through 360°.

12. A lawn trimmer and edger in accordance with claim 10 in which the biasing means is a helical coil spring embraceably arranged on the leading end of said arm and the self-cleaning guard means comprises a semi-circular plate attached to the outer edge of the guard means and defining therewith an opening back of the plate for discharge of debris in a direction away from the operator of the lawn trimmer and edger.

13. A lawn trimmer and edger in accordance with claim 1 in which one of the wheels of said carriage is adjustable vertically with respect to said carriage.

14. A lawn trimmer and edger in accordance with claim 1 in which the leading wheel and one of the trailing wheels of said carriage are adjustable vertically with respect to said carriage.

15. A lawn trimmer and edger in accordance with claim 1 in which the leading wheel is adjustable vertically with respect to said carriage.

16. A guard means for a rotatable blade of a lawn trimmer and edge adapted to be mounted on an arm carried by said lawn trimmer and edger in blade protecting relationship which comprises, a guard plate member provided with a guide surface having a leading outer edge and covering approximately 180° of said blade for protecting the operator of said trimmer and edger from flying debris, and a pointed guide member attached laterally to said guard means and leading said guard means cooperating with the guide surface for pulling runners and tendrils of grass into the area circumscribed by said blade operating in a trimming position.

17. A guard means in accordance with claim 16 in which the guide surface is curved.

18. A guard means in accordance with claim 16 in which the guard plate member has a semi-circular self-cleaning guard plate attached to the guard plate member in spaced relationship, trailing said blade and providing an opening between the self-cleaning guard plate and the guard plate member through which debris is discharged, said blade being adapted to rotate in said space.

References Cited in the file of this patent

UNITED STATES PATENTS

| | | |
|---|---|---|
| D. 163,486 | Sanford | May 29, 1951 |
| 2,115,265 | Jennett | Apr. 26, 1938 |
| 2,165,551 | Iverson | July 11, 1939 |
| 2,312,972 | Orr | Mar. 2, 1943 |
| 2,523,640 | Zipf | Sept. 26, 1950 |
| 2,538,230 | Boggs | Jan. 16, 1951 |
| 2,614,473 | Yacoby | Oct. 21, 1952 |
| 2,618,919 | Hutchens | Nov. 25, 1952 |
| 2,628,424 | McMillan et al. | Feb. 17, 1953 |
| 2,632,990 | Stricklen et al. | Mar. 31, 1953 |
| 2,643,503 | Noyes | June 30, 1953 |
| 2,680,945 | Reed | June 15, 1954 |
| 2,691,264 | Miller | Oct. 12, 1954 |
| 2,707,361 | Thomas | May 3, 1955 |